US009135246B2

(12) United States Patent
Kajikawa (10) Patent No.: US 9,135,246 B2
(45) Date of Patent: Sep. 15, 2015

(54) ELECTRONIC DEVICE WITH A DICTIONARY FUNCTION AND DICTIONARY INFORMATION DISPLAY METHOD

(71) Applicant: CASIO COMPUTER CO., LTD., Shibuya-ku, Tokyo (JP)

(72) Inventor: Tomoya Kajikawa, Nishitama-gun (JP)

(73) Assignee: CASIO COMPUTER CO., LTD., Tokyo (JP)

(*) Notice: Subject to any disclaimer, the term of this patent is extended or adjusted under 35 U.S.C. 154(b) by 288 days.

(21) Appl. No.: 13/786,409

(22) Filed: Mar. 5, 2013

(65) Prior Publication Data

US 2013/0238322 A1    Sep. 12, 2013

(30) Foreign Application Priority Data

Mar. 6, 2012 (JP) .................................. 2012-049676

(51) Int. Cl.
*G06F 17/21* (2006.01)
*G06F 17/28* (2006.01)
*G06F 17/27* (2006.01)

(52) U.S. Cl.
CPC .......... *G06F 17/289* (2013.01); *G06F 17/2735* (2013.01)

(58) Field of Classification Search
None
See application file for complete search history.

(56) References Cited

U.S. PATENT DOCUMENTS

| | | | | | |
|---|---|---|---|---|---|
| 4,481,607 | A | * | 11/1984 | Kobayashi et al. | 704/7 |
| 6,009,443 | A | * | 12/1999 | Kawamura | 715/246 |
| 6,553,103 | B1 | * | 4/2003 | Forlenza et al. | 379/93.01 |
| 7,321,857 | B2 | * | 1/2008 | Rodriguez et al. | 704/275 |
| 7,451,076 | B2 | * | 11/2008 | Nakamura et al. | 704/7 |
| 7,912,697 | B2 | * | 3/2011 | Tomishige et al. | 704/8 |
| 8,577,149 | B2 | * | 11/2013 | Toriyama | 382/189 |
| 8,832,550 | B2 | * | 9/2014 | Abe | 715/259 |
| 2005/0228639 | A1 | * | 10/2005 | Abe et al. | 704/7 |
| 2012/0209595 | A1 | * | 8/2012 | Hokuchi | 704/10 |
| 2014/0032584 | A1 | * | 1/2014 | Baker et al. | 707/758 |

FOREIGN PATENT DOCUMENTS

| | | |
|---|---|---|
| JP | 10-149486 A | 6/1998 |
| JP | 2009-164995 A | 7/2009 |

* cited by examiner

*Primary Examiner* — Satwant Singh
(74) *Attorney, Agent, or Firm* — Holtz, Holtz, Goodman & Chick PC (57) ABSTRACT

An electronic device with a dictionary function includes a dictionary data memory, a dictionary search section which makes a dictionary search on the basis of a user operation, a series process storage section which stores data items representing the ones in a series of dictionary search processes performed at the dictionary search section, a detection section which detects an instruction to point in a direction given by a user operation, and a series process reproduction section which reads the series of processed data items stored in the series process storage section in response to the detection of an instruction to point in a specific direction at the detection section and displays a display screen corresponding to each of the processes on a display section.

12 Claims, 7 Drawing Sheets

(A)
ENGLISH-JAPANESE DICTIONARY — G(16)
SEARCH WORD 【base         】 — Ak
Cu — base                base/beis/ — 17
     baseball            〈名〉複: bases
     baseman             ① 土台, 基底, 底   (EXAMPLE) — d
     basement
     bash                ② …
     bashuful
     bashing             ③ …            — Pv
Lm — basic (B)
ENGLISH-JAPANESE DICTIONARY
base/beis/                              — 17
〈名〉複: bases
① 土台, 基底, 底          (EXAMPLE)
② …                                    — Ge(16)
③ 計画の基礎, 思考の根拠    (EXAMPLE)

(C)
ENGLISH-JAPANESE DICTIONARY
② …                                    — Ge(16)
③ 計画の基礎, 思考の根拠    (EXAMPLE) — 17
(base)
Cu — use the [novel] as a base for the film
映画の下敷きとしてその小説を使う
raise the wage base                    — Lx
ベースアップする

(D)
ENGLISH-JAPANESE DICTIONARY
novel/návl/nóv-                         — 17
〈名〉長編小説
                                        — u
                                        — Ge(16)

ELECTRONIC DEVICE WITH A DICTIONARY FUNCTION AND DICTIONARY INFORMATION DISPLAY METHOD

CROSS-REFERENCE TO RELATED APPLICATIONS

This application is based upon and claims the benefit of priority from prior Japanese Patent Application No. 2012-049676, filed Mar. 6, 2012, the entire contents of which are incorporated herein by reference.

BACKGROUND OF THE INVENTION

1. Field of the Invention

Embodiments described herein relate generally to an electronic device with a dictionary function of retrieving explanatory information on any word or phrase and a dictionary information display method.

2. Description of the Related Art

In recent years, the electronic dictionary devices have been configured to have more and more functions. For example, an electronic dictionary device can not only retrieve an entry word coinciding with a search word input by the user and display explanatory information on the entry word but also display an example or a commentary included in the explanatory information on another screen or directly specify a desired word included in text displayed in any stage to make an entry word search (jump search), thereby displaying the explanatory information immediately.

As described above, the electronic dictionary device enables the user to start from dictionary information currently being displayed to related pieces of dictionary information on the screen so as to cause the related pieces of dictionary information to transit to one after another. When having searched for related words one after another, the user may want to learn the words together with their background.

In this case, with a conventional electronic dictionary device, the user has to repeat exactly the same operation as a series of dictionary searches done by the user, which is very annoying. In addition, the user might not be able to perform the same operation unless the user has a clear memory of what the user has done in the series of dictionary searches.

In this connection, various devices have been proposed which have a macro function, a shortcut function, or the like of recording a series of consecutive operations in advance and enabling the recorded series of operations to be performed en bloc on the basis of a user operation (refer to, for example, Jpn. Pat. Appln. KOKAI Publication No. 2009-164995 and Jpn. Pat. Appln. KOKAI Publication No, 10-149486).

With the conventional device that enables the previously recorded series of operations to be performed en bloc on the basis of a user operation, it is difficult for the user to check the result of each operation because the series of operation is performed all at once.

Therefore, even if such a conventional device is applied to the electronic dictionary device, the user cannot reconfirm a series of pieces of dictionary information obtained by searching for related words consecutively by jump search or the like to memorize or learn the series of pieces of dictionary information including how the last piece of dictionary information has been reached.

It is, accordingly, an object of the invention to provide an electronic device with a dictionary function of capable of displaying, one by one consecutively, a series of pieces of dictionary information search for and a dictionary information displaying method.

BRIEF SUMMARY OF THE INVENTION

An electronic device with a dictionary function according to the invention includes:
a dictionary data memory which stores dictionary data;
a dictionary search module which makes a dictionary search using the dictionary data on the basis of a user operation;
a series process storage module which stores data items representing the ones in a series of dictionary search processes performed at the dictionary search module;
a detection module which detects an instruction to point in a direction given by a user operation; and
a series process reproduction module which sequentially reads the series of processed data items stored in the series process storage module in response to the detection of an instruction to point in a specific direction given by a user operation at the detection module and displays a display screen corresponding to each the processes on the display module in sequence.

According to the invention, it is possible to reconfirm a series of pieces of dictionary information searched for by displaying them one by one consecutively.

Advantages of the invention will be set forth in the description which follows, and in part will be obvious from the description, or may be learned by practice of the invention. Advantages of the invention may he realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, an embodiment of the invention will be explained.

Figure 1:
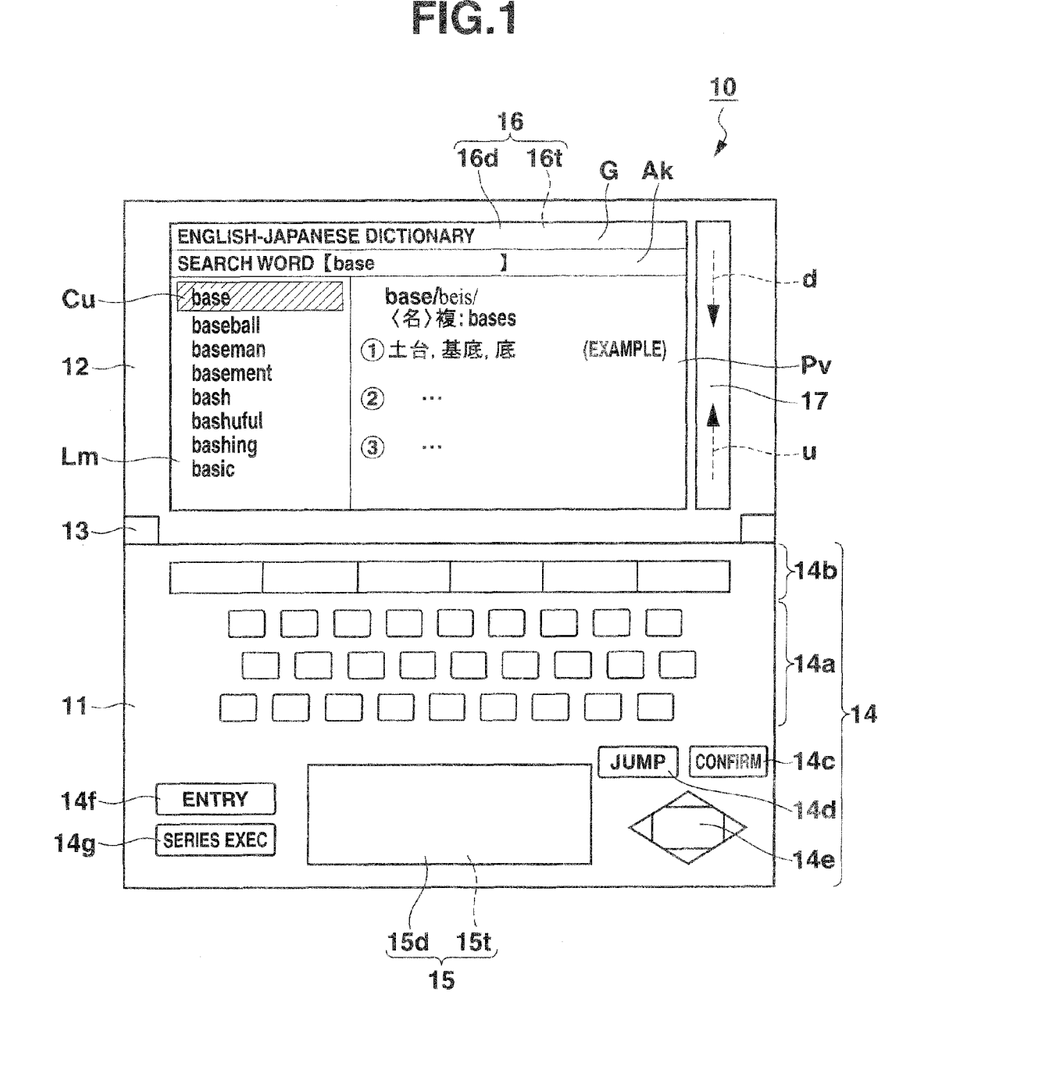
FIG. 1 is a front view showing an outer configuration of an electronic dictionary device 10 according to an embodiment of the invention.

FIG. 1 is a front view showing an outer configuration of an electronic dictionary device 10 according to an embodiment of the invention.

The electronic dictionary device 10 is configured as a portable device dedicated to an electronic dictionary explained below or as a personal digital assistant (PDA), a personal computer (PC), a mobile phone, an electronic book reader, a portable video game console, or the like each of which has a dictionary function.

The electronic dictionary device 10 is so configured that a body case 11 and a cover case 12 are coupled with each other via a hinge part 13 so as to form a foldable case that can be opened and closed. At the surface of the body case 11 with the foldable case opened, there are provided a key input module 14 and a touchpanel auxiliary display module 15. The key input module 14 comprises character input keys 14a, dictionary specify keys 14b, [Confirm] key 14c, [Jump] key 14d, cursor keys 14e, [Entry] key 14f, and [Consecutive Execution] key 14g.

The touchpanel auxiliary display module 15 has a structure where a touch position detection device that detects a position touched by the user with a stylus pen, a finger, or the like and a display device are integrally formed. The auxiliary display module 15 is so configured that, for example, a transparent touchpanel 15t is laid on a 256×64 dot backlight color liquid-crystal display screen 15d on the front side of the central part of the key input module 14. If needed, the auxiliary display module 15 is switched between a handwriting character input area for inputting a handwriting character, a key input area for various functions, and an area where these input areas are mixed.

A trace of handwriting input in the handwriting character input area switched on the auxiliary display module 15 is echoed back to the backlight color liquid-crystal display screen 15d, which displays the trace.

At the surface of the cover case 12, there are provided, for example, a 480×320 dot backlight touchpanel main display module 16 to cover almost all the surface and a vertically long scroll pad 17 along the right edge of the main display module 16.

Like the auxiliary display module 15, the touchpanel main display module 16 has a structure where a display device and a touch position detection device that detects a position touched by the user with a stylus pen, a finger, or the like are integrally formed. The main display module 16 is so configured that a transparent touchpanel 16t is laid on a backlight color liquid-crystal display screen 16d.

The scroll pad 17, which is composed of a touch position detection device corresponding to the vertical length of the main display module 16, can determine the direction, distance, and speed of sliding of a touch position.

The electronic dictionary device 10 has the function of scrolling a screen G on which explanatory information, a list of example sentences, or the like is displayed on the basis of a user operation on the scroll pad 17. The scroll pad 17 further has the function of displaying a series of related pieces of dictionary information dictionary-searched so as to move them backward sequentially by, for example, an upward slide (upward flick u) or move them forward sequentially downward by a downward slide (downward flick d).

Here, a flick means that the user touches the scroll pad 17 with a finger and slides the finger quickly in a longitudinal direction of the pad 17.

On an entry word search screen G for "English-Japanese dictionary" in FIG. 1, Ak indicates an input area, Lm a list area for entry words prefix-matched with a search word, Cu an inverted cursor that selects an entry word and highlights the word, and Pv a preview area for explanatory information on the selected entry word.

Figure 2:
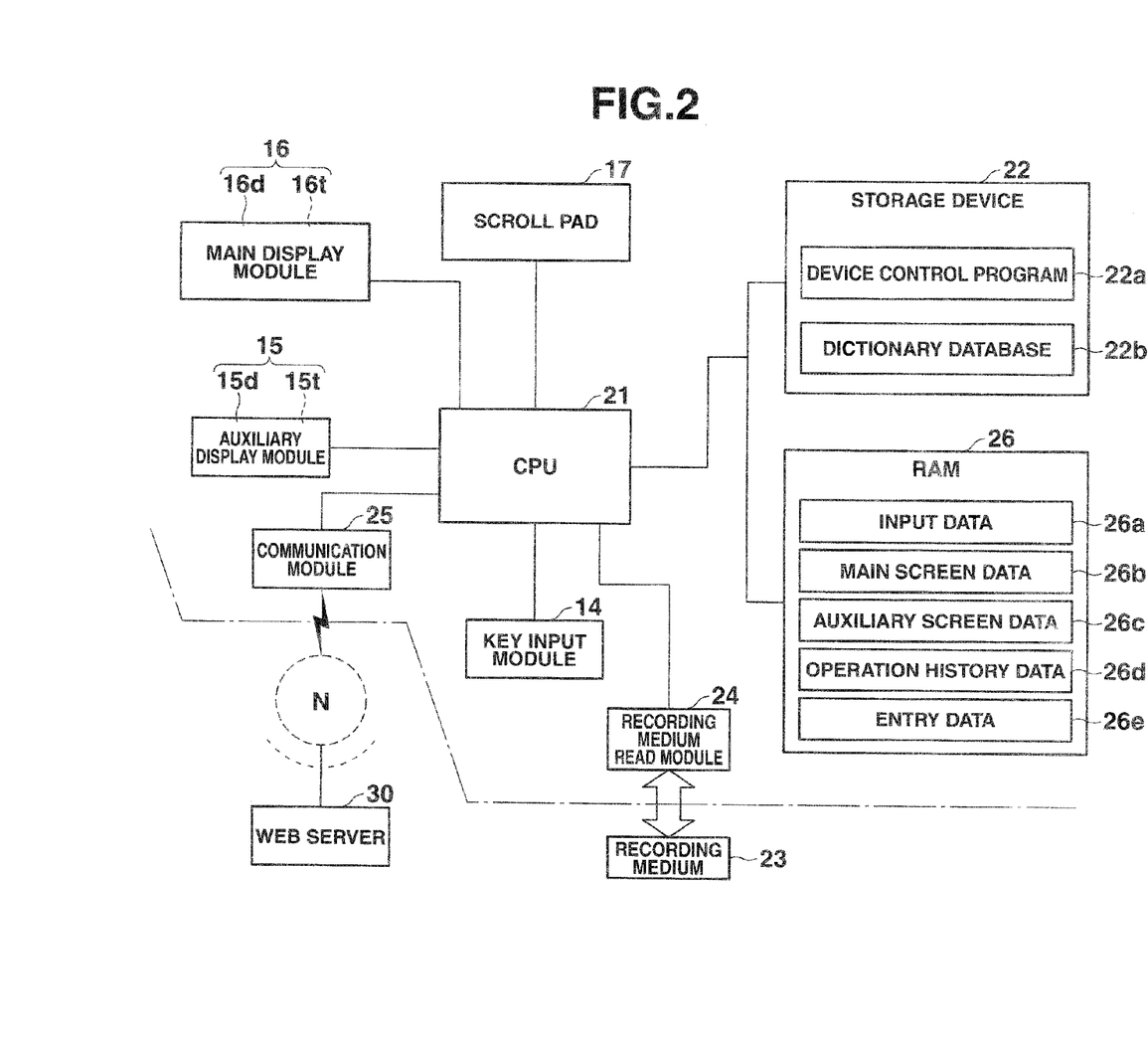
FIG. 2 is a block diagram showing a configuration of the electronic circuitry of the electronic dictionary device 10.

FIG. 2 is a block diagram showing a configuration of the electronic circuitry of the electronic dictionary device 10.

The electronic dictionary device 10 is composed of a computer which reads programs recorded in various recording mediums and is controlled by the read programs. The electronic circuitry of the device 10 comprises a central processing unit (CPU) 21.

The CPU 21 controls the operation of each of the various parts of the circuitry using a RAM 26 as a work memory on the basis of a device control program 22a prestored in a storage device 22. The device control program 22a may be read into the storage device 22 from an external recording medium 23, such as a ROM card, via a recording medium read module 24, or from a Web server (in this case, a program server) 30 on the Internet N via a communication module 25.

The device control program 22a stored in the storage device 22 is activated in response to an input signal corresponding to a user operation from the key input module 14, auxiliary display module 15, main display module 16, or scroll pad 17 or a communication signal from each Web server 30 on the Internet N connected via the communication module 25.

Connected to the CPU 21 are the storage device 22, recording medium read module 24, communication module 25, RAM 26, key input module 14, auxiliary display module 15, main display module 16, and scroll pad 17.

Stored as the device control programs 22a in the storage device 22 are a system program that supervises the operation of the entire electronic dictionary device 10 and a communication program for performing data communication with each Web server 30 or a user personal computer (PC) (not shown) on the Internet N via the communication module 25. Further stored as the device control program 22a is a dictionary search program for controlling search and display processes in general based on a dictionary database 22b stored in the storage device 22. The dictionary search program performs the process of inputting a search word, the process of retrieving an entry word corresponding to a search word, the process of displaying retrieved entry words in list form, the process of reading and displaying various pieces of explanatory information, including translations, semantic contents, examples, and commentaries corresponding to the selected entry word, the process of jump-searching for a specified word, the process of sequentially retreating or advancing a series of pieces of dictionary information dictionary-searched for on the basis of a user operation on the scroll pad 17, and more.

For example, in the dictionary database 22b, not only [Japanese-language dictionary] where Japanese explanatory information has been written so as to correspond to a Japanese entry word, [English-Japanese dictionary] where Japanese explanatory information has been written so as to correspond to an English entry word, [Japanese-English dictionary] where English explanatory information has been written so as to correspond to a Japanese entry word, and [Encyclopedia] where explanatory information has been written so as to correspond to entry words in various genres but also a plurality of types of dictionary data have been previously stored or downloaded and stored.

In the RAM 26, an input data memory 26a, a main screen data memory 26b, an auxiliary screen data memory 26c, an operation history data memory 26d, an entry data memory 26e, and the like are secured.

Figure 3:
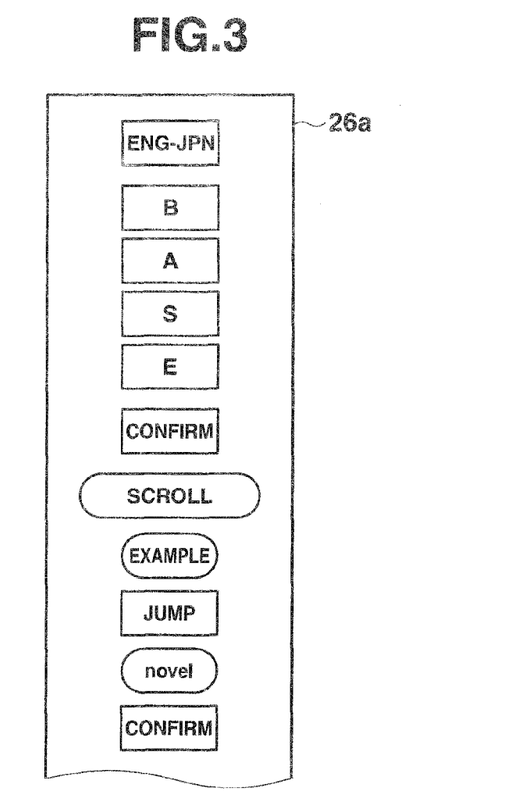
FIG. 3 shows a concrete example of input data stored in an input data memory 26a of the electronic dictionary device 10.

FIG. 3 shows a concrete example of input data stored in the input data memory 26a of the electronic dictionary device 10.

In the input data memory 26a, each item of key data input by the user on the key input module 14 and data items based on touch operations on the auxiliary display module 15 and main display module 16 are stored in sequence.

In the main screen data memory 26b, display data to be displayed on the main display module 16 is developed into a bitmap pattern and stored.

In the auxiliary screen data memory 26c, display data to be displayed on the auxiliary display module 15 is developed into a bitmap pattern and stored.

Figure 4:
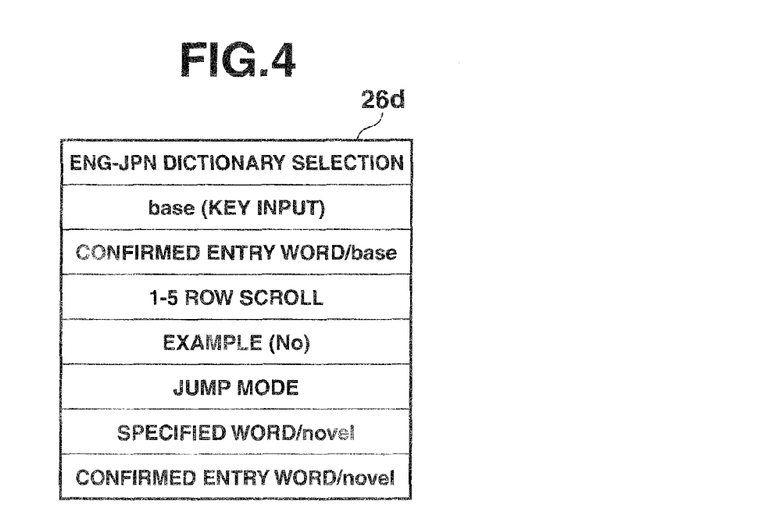
FIG. 4 shows a concrete example of operation history data stored in an operation history data memory 26d of the electronic dictionary device 10.

FIG. 4 shows a concrete example of operation history data stored in the operation history data memory 26d of the electronic dictionary device 10.

In the operation history data memory 26d, a history of each of a series of dictionary search processes performed on the basis of the individual items of key data and touch data stored in the input data memory 26a is stored in sequence temporarily.

Figure 7:
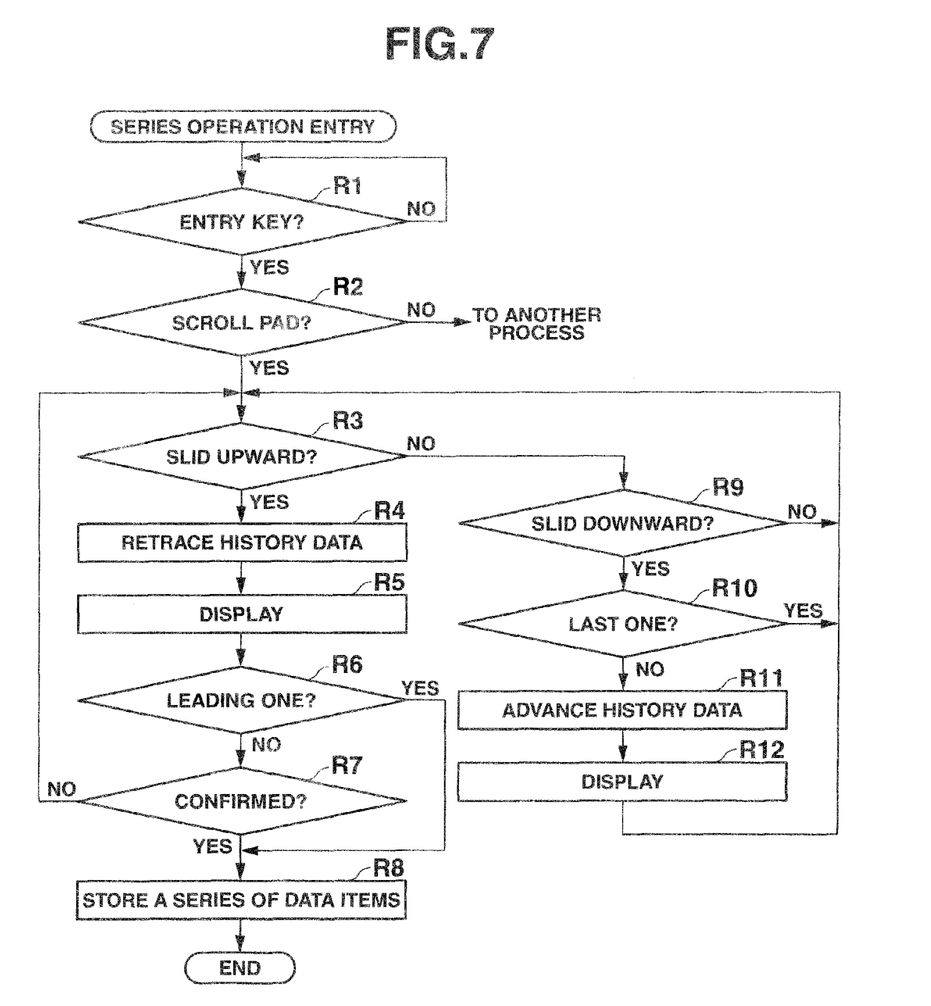
FIG. 7 is a flowchart to explain a series operation entry process in the electronic dictionary device 10.

In the entry data memory 26e, the processes ranging from the user-specified process to the last process are extracted from the series of dictionary search processes recorded in the operation history data memory 26d and then entered by a series operation entry process (see FIG. 7).

With the electronic dictionary device 10 configured as described above, the CPU 21 controls the operations of various parts of the circuitry on the basis of the instructions written in the device control program 22a (including a program for executing the search word input process, entry word search process, entry word list display process, selected entry word explanatory information display process, specified word jump search process, and the process of sequentially retracing or advancing a series of dictionary search processes on the basis of a user operation on the scroll pad 17) so as to cause software and hardware to cooperate with each other in operation, thereby realizing the functions described below.

Next, an operation of the electronic dictionary device 10 with the above configuration will be explained.

Figure 5:
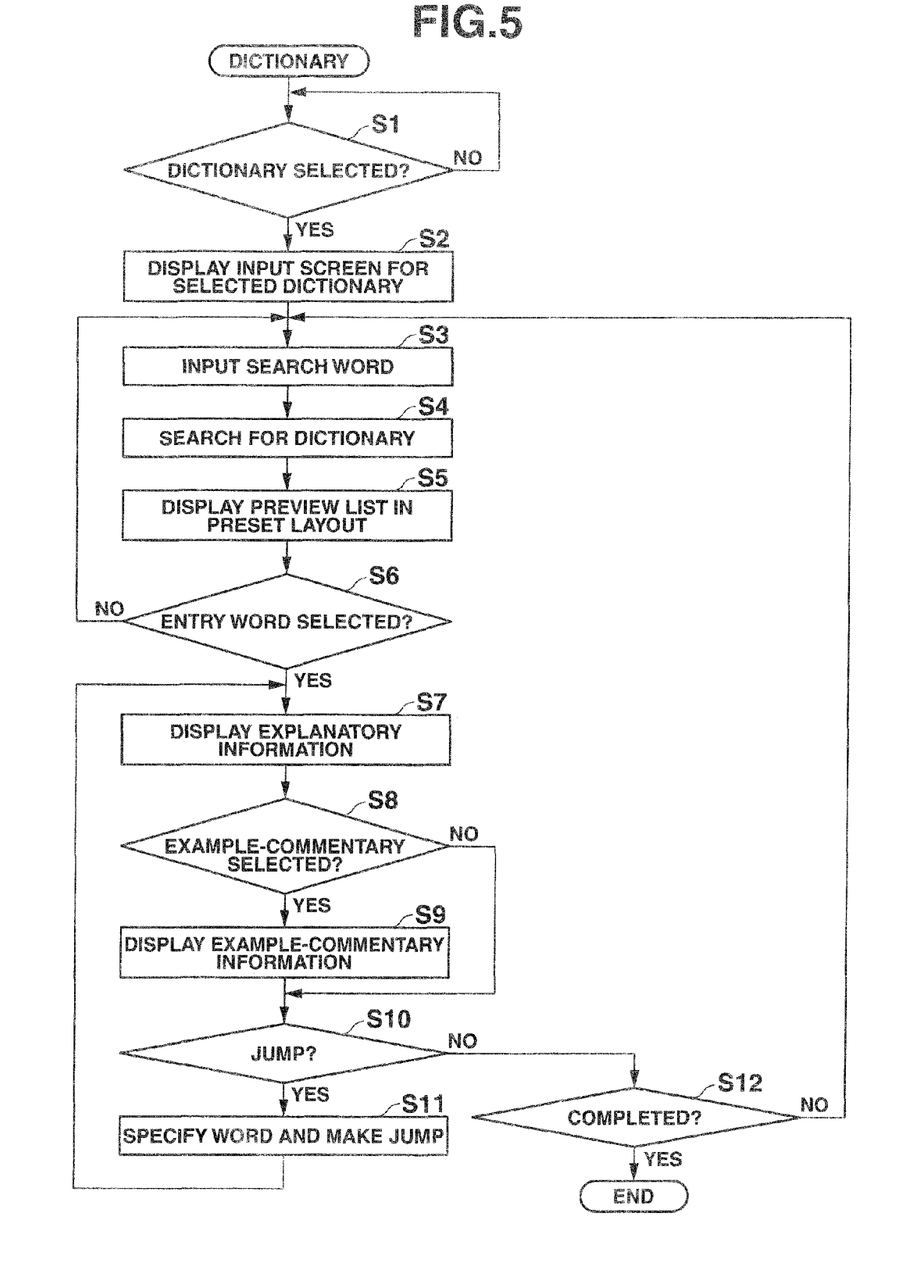
FIG. 5 is a flowchart to explain a dictionary search process in the electronic dictionary device 10.

FIG. 5 is a flowchart to explain a dictionary search process in the electronic dictionary device 10.

Figure 6:
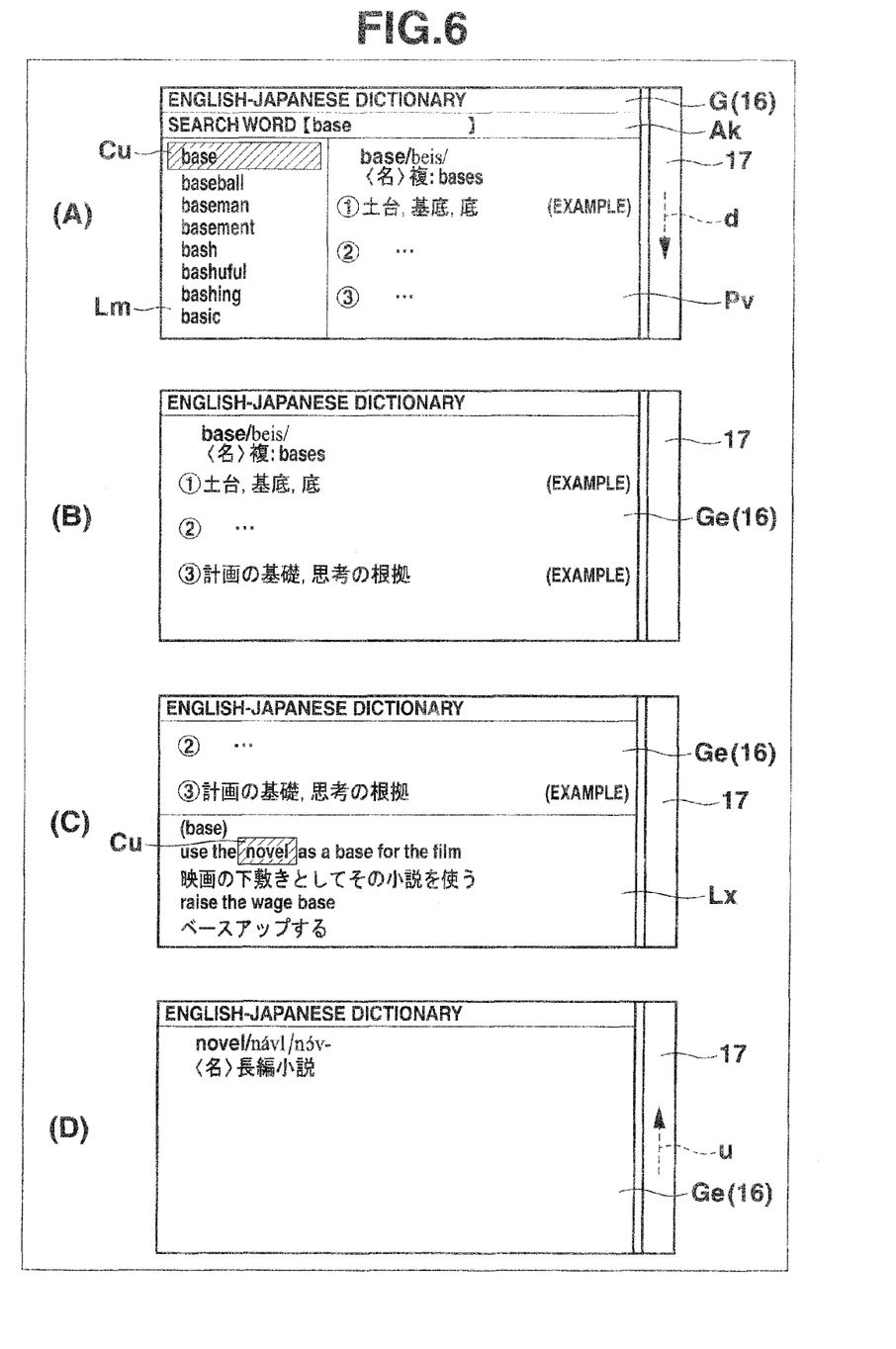
FIG. 6 shows a series of display operations involved in a dictionary search process in the electronic dictionary device 10.

FIG. 6 shows a series of display operations involved in a dictionary search process in the electronic dictionary device 10.

When an arbitrary dictionary, for example, [English-Japanese dictionary], has been selected by the user with the dictionary specify keys 14b (Yes in step S1), an initial screen (not shown) for inputting a search word for the selected dictionary [English-Japanese dictionary] is displayed on the main display module 16 (step S2).

On the search word input screen, when the user has input a desired search word, for example, "base" using keys (step S3), the input search word "base" is displayed in a search word input area Ak of the entry word search screen G as shown in FIG. 6(A). In addition, entry words prefix-matched with "base" are retrieved from the [English-Japanese dictionary] (22b) (step S4). With the retrieved entry word in the lead, a specific number of entry words are extracted and displayed in list form in an entry word list area Lm. Then, the inverted cursor Cu is displayed at the leading entry word and explanatory information on the entry word (word) "base" is read and displayed in a preview area Pv (step S5).

Here, when the [Confirm] key 14c has been pressed, confirming the selection of the entry word (word) "base" (Yes in step S6), an explanatory information display screen Ge corresponding to the selected entry word "base" is displayed on the main display module 16 (step S7) as shown in FIG. 6(B).

A series of pieces of key data corresponding to a user operation in such a dictionary search process is input sequentially in the input data memory 26a (see FIG. 3) and recorded there. In addition, a series of processes performed on the basis of the input of the key data is recorded sequentially into the operation history data memory 26a (see FIG. 4).

On the explanatory information display screen Ge shown in FIG. 6(B), when the user has pressed the cursor key (scroll key) 14e so as to scroll the displayed contents downward from a first row to a fifth row on the screen and then pressed the [Example] key (not shown) made to correspond to a third word meaning "(3) 計画の基礎 . . . " (Yes in step S8), the corresponding example is read from the [English-Japanese dictionary] (22b) and displayed in an example display area Lx as shown in FIG. 6(C) (step S9).

Here, when the user has pressed the [Jump] key 14d to make an entry word search (jump search) specifying a desired word in the example display area Lx, a jump search mode is set (Yes in step S10).

Then, when the user has specified a desired word "novel" in the example display area Lx with the inverted cursor Cu and pressed the [Confirm] key 14c to perform an entry word search (jump search) (step S11), explanatory information corresponding to the specified word "novel" is read from the [English-Japanese dictionary] (22b) and displayed as an explanatory information display screen Ge on the main display module 16 as shown in FIG. 6(D) (step S7).

After this, various processes, including the search word input process, entry word search process, explanatory information display process, display screen scroll process, jump search process, and example-commentary display process, are performed suitably on the basis of the processes in steps S3 to S11 until another dictionary has been selected as a search target or it has been determined from power-off that the use of the selected dictionary has been completed (Yes in step S12). Then, in the input data memory 26a (see FIG. 3), the series of key data items are recorded successively. In addition, in the operation history data memory 26a (see FIG. 4), the series of processes are recorded sequentially.

When the user wants to enter and store a history of the series of dictionary search processes after having executed the series of dictionary search processes shown in FIGS. 6(A) to 6(D), the user presses the [Entry] key 14f, thereby performing a series operation entry process in FIG. 7. At this time, in the operation history data memory 26a, data indicating that a English-Japanese dictionary has been selected, data indicating that "base" has been input using keys, data indicating that the entry word "base" has been selected and its explanatory information has been displayed, data indicating that the screen has been scrolled five rows, data indicating that "Example" has been specified and an example has been displayed, and the like have been stored in sequence as shown in FIG. 4.

FIG. 7 is a flowchart to explain a series operation entry process in the electronic dictionary device 10.

As shown in FIG. 6(D), with the explanatory information display screen being displayed as a result of a jump search made by specifying the word "novel," when the [Entry] key 14f has been pressed (Yes in step R1), a series operation entry process is started. Then, control stands ready until the user has operated the scroll pad 17 (step R2). When the user has operated the scroll pad 17, it is determined whether the scroll pad has been received an upward or downward slide (steps R3 and R9). When the scroll pad 17 has received an upward slide (or been given an upward flick u) (Yes in step R3), the history data items recorded in the operation history data memory 26d are specified in reverse order. Each time a history data item is specified, a display screen corresponding to the specified process is displayed (steps R4, R5).

Specifically, data specifying the word "novel" in the next-to-last jump search mode in the history data items stored in the operation history data memory 26a is read and a screen on which the inverted cursor Cu is displayed at the word "novel" specified in the example display area Lx of FIG. 6(C) is displayed. Next, data indicating that the jump search mode has been set is read from the operation history data memory 26a and the display returns to what was before the word "novel" was specified. As described above, the history data items are read, starting with the last one in reverse order in the operation history data memory 26a. After that, a screen that displays an example not set in the jump search mode, an explanatory information display screen Ge for the entry word "base" scrolled downward five rows, the first explanatory information display screen Ge for the entry word "base" in FIG. 6(B), and an entry word search screen G obtained by combining a search word input area Ak and an entry word list area Lm and a preview area Pv in FIG. 6(A) are displayed in that order.

On the other hand, when the scroll pad 17 has received a downward slide (or been given a downward flick d) (Yes in step R9), ones advanced sequentially in the processed data items of the currently displayed dictionary search process recorded in the operation history data memory 26d are specified. Each time a processed data item is specified, a display screen corresponding to the specified process is displayed (steps R10 to R12).

As described above, an upward flick (u) or a downward flick (d) is given to the scroll pad 17, making it possible to display a display screen in each stage of a series of search processes performed until then.

With a display screen in a stage desired by the user having been recovered, when the [Confirm] key 12c has been pressed (Yes in step R7), operation history data ranging from operation history data at the recovered point to the last operation history data are extracted and stored in the entry data memory 26e (step R8).

When the leading processed data stored in the operation history data memory 26d (see FIG. 4) has been reached in reverse order and specified on the basis of an upward flick (u) on the scroll pad 17 and an initial screen with the dictionary [English-Japanese dictionary] selected has been displayed (Yes in steps R3 to R6), all the operation history data items recorded in the operation history data memory 26d are extracted and stored in the entry data memory 26e (step R8).

Then, a series of processed data items stored in the entry data memory 26e as a result of the series operation entry process (see FIG. 7) is stored with the leading character string of display contents corresponding to the last processed data item being set as a file name. Specifically, when a series of processed data items shown in FIGS. 6(A) to 6(D) have been entered, a file name "novel" is given.

In this way, when the user reconfirms the stored past dictionary search processes after having stored operation history data, the user presses the [Series Execution] key 14g.

Figure 8:
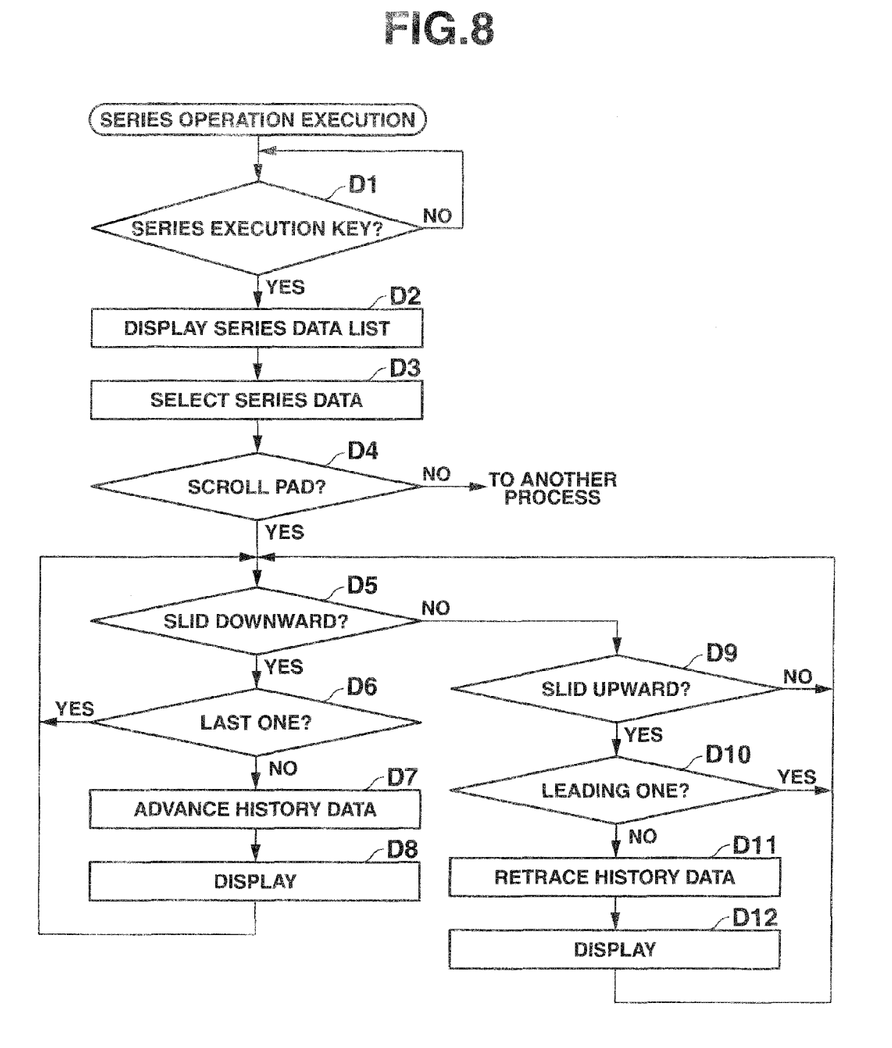
FIG. 8 is a flowchart to explain a series operation execution process in the electronic dictionary device 10.

FIG. 8 is a flowchart to explain a series operation execution process in the electronic dictionary device 10.

When the [Series Execution] key 14g has been pressed (Yes in step D1), the file names of the series of processed data items stored in the entry data memory 26e are read and displayed in list form on the main display module 16.

On the file name list display screen, when the user has selected a desired file (step D3), control stands ready until the user has operated the scroll pad 17 (step D4). When the user has operated the scroll pad 17, it is determined whether the scroll pad 17 has received an upward or downward slide (steps D5, D9). When the scroll pad 17 has received a downward slide (or been given a downward flick d) (Yes in step D5), it is determined that an instruction to point in a specific direction has been given. Then, the series of processed data items stored in the selected file is read sequentially, starting with the leading one, with the result that corresponding display screen data items are created sequentially and displayed on the main display module 16 (steps D6 to D8).

Specifically, the series of processed data items shown in the operation history data memory 26d of FIG. 4 has been stored in the entry data memory 26e. When the series of processed data items has been selected in the series operation execution process this time, an initial screen (not shown) that has selected [English-Japanese dictionary], the entry word search screen G shown in FIG. 6(A), the explanatory information display screen shown in FIG. 6(B), the explanatory information display screen Ge scrolled five rows shown in FIG. 6(C), an explanatory information display screen Ge that includes an example display area Lx, a screen where the inverted cursor Cu is displayed at the specified word "novel" in the example display area Lx in the jump search mode, and an explanatory information display screen Ge corresponding to the jump search word "novel" shown in FIG. 6(D) are displayed in that order by giving the downward flick (d).

On the other hand, when the scroll pad 17 has received an upward slide (or been given an upward flick u) (Yes in step D9), it is determined that an instruction to point in a direction opposite to the specific direction has been given and the series of processed data items is read in reverse order, with the result that corresponding display screen data items are created sequentially and displayed on the main display module 16 (steps D10 to D12).

With the electronic dictionary explained above, a series of dictionary search processes performed by a user operation can be entered as an operation history in a desired range, starting with the last process in reverse order as needed. In the future, it is possible to read the series of processed data items sequentially, starting with the leading one in normal order as needed, and reconfirm each piece of dictionary information, thereby enabling the dictionary information to be memorized or learned.

Although the embodiment has been so configured that processed data items recorded in the operation history data memory 26d are read sequentially on the basis of a flick operation on the scroll pad 17 and their display screen is displayed, it may be so configured that the number of processed data items and the speed at which they are displayed are changed on the basis of the distance or speed of the flick operation.

In addition, while in the embodiment, the scroll pad 17 has been configured so as to be independent of the touchpanel main display module 16, it may be configured to cause a part of the touchpanel display module 16 to function as a scroll pad. Moreover, using the whole area of the touchpanel, it may be determined that an instruction to point in a specific direction has been given when the scroll pad 17 has been flicked upward above a horizontal reference line and that an instruction to point in a direction opposite to the specific direction has been given when the scroll pad 17 has been flicked downward below the horizontal reference line. Furthermore, cursor keys indicating an upward direction and a downward direction may be allocated to an upward-flick operation and a downward-flick operation, not to a scroll pad, and the functions explained above may be activated by a direction indicating operation of the cursor keys. Still furthermore, for example, a rotary switch may be provided to cope with a right and a left rotation direction.

The methods of the individual processes and the databases in the electronic dictionary device 10 written in the embodiment, including the dictionary search process shown in the flowchart of FIG. 5, the series operation entry process shown in the flowchart of FIG. 7, the series operation execution process shown in the flowchart of FIG. 8, and the dictionary database 22b, can be stored in the external recording medium 23, such as a memory card (for example, a ROM or RAM card), a magnetic disk (for example, a floppy or hard disk), an optical disk (for example, a CD-ROM or DVD), or a semiconductor memory, in the form of programs the computer can execute. Then, such recording mediums can be distributed. The computer of an electronic device including a display module (15, 16) and a contact position detection module (17) loads the program recorded in the external recording medium 23 into a storage device 22. The computer is controlled by the read-in program, thereby realizing the function of entering and performing an operation history resulting from a series of dictionary search processes explained in the embodiment, which enables the same processes in the aforementioned methods to be performed.

Furthermore, the data of the programs which realize the above methods can be transferred in the form of program code over a network (N). The program data can be loaded into the computer of an electronic device including a display module (15, 16) and a contact position detection module (17) via a communication module 25, thereby realizing the function of entering and performing an operation history resulting from the series of dictionary search processes explained above.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

What is claimed is:

1. A method of displaying dictionary information in an electronic device comprising a dictionary data memory which stores dictionary data, the method comprising:
   executing a dictionary search using the dictionary data based on an operation by a user;
   storing, in a memory, data items representing a series of operations performed by the user in a series of dictionary search processes performed in executing the dictionary search;
   detecting one of a forward direction and a reverse direction based on an instruction by the user; and
   sequentially reading the data items representing the series of operations performed by the user and stored in the memory in normal order if the forward direction is detected, and sequentially reading the data items representing the series of operations performed by the user and stored in the memory in reverse order if the reverse direction is detected, and generating a display screen corresponding to each of the operations and displaying the display screen on a display module.

2. The method of claim 1, further comprising:
   temporarily and sequentially storing, in the memory, the data items representing the series of operations performed by the user involved in the series of dictionary search processes; and
   in response to detecting the reverse direction after receiving the input of the instruction by the user, sequentially reading the temporarily stored data items representing the operations performed by the user in reverse order, from a data item representing a most recent operation to a data item representing a specific operation, and generating a display screen corresponding to each of the operations and displaying the display screen on the display module,
   wherein the storing of the data items representing the series of operations includes storing data items which are included in the temporarily stored data items representing the operations performed by the user and which range from the data item representing the specific operation to the data item representing the most recent operation.

3. The method of claim 1, wherein the detecting of the direction is based on movement of a position touched by the user on a touch position detection device.

4. The method of claim 1, wherein the dictionary search processes include a jump search process, and the storing of the data items representing the series of operations includes storing a word specified in the jump search process.

5. A non-transitory recording medium having recorded thereon a program which is executable by a computer of an electronic device comprising a dictionary data memory which stores dictionary data, the program being executable to control the computer to perform functions comprising:
   executing a dictionary search using the dictionary data based on an operation by a user;
   storing, in a memory, data items representing a series of operations performed by the user in a series of dictionary search processes performed in executing the dictionary search;
   detecting one of a forward direction and a reverse direction based on an instruction by the user; and
   sequentially reading the data items representing the series of operations performed by the user and stored in the memory in normal order if the forward direction is detected, and sequentially reading the data items representing the series of operations performed by the user and stored in the memory in reverse order if the reverse direction is detected, and generating a display screen corresponding to each of the operations and displaying the display screen on a display module.

6. The non-transitory recording medium of claim 5, wherein the program is executable to control the computer to perform further functions comprising:
   temporarily and sequentially storing, in the memory, the data items representing the series of operations performed by the user involved in the series of dictionary search processes; and
   in response to detecting the reverse direction after receiving the input of the instruction by the user, sequentially reading the temporarily stored data items representing the operations performed by the user in reverse order, from a data item representing a most recent operation to a data item representing a specific operation, and generating a display screen corresponding to each of the operations and displaying the display screen on the display module,
   wherein the storing of the data items representing the series of operations includes storing data items which are included in the temporarily stored data items representing the operations performed by the user and which range from the data item representing the specific operation to the data item representing the most recent operation.

7. The non-transitory recording medium of claim 5, wherein the detecting of the direction is based on movement of a position touched by the user on a touch position detection device.

8. The non-transitory recording medium of claim 5, wherein the dictionary search processes include a jump search process, and the storing of the data items representing the series of operations includes storing a word specified in the jump search process.

9. An electronic device comprising:
a memory which stores at least dictionary data;
a display module; and
a processor which is configured to:
execute a dictionary search using the dictionary data based on an operation by a user;
store, in a memory, data items representing a series of operations performed by the user in a series of dictionary search processes performed in executing the dictionary search;
detect one of a forward direction and a reverse direction based on an instruction by the user; and
sequentially read the data items representing the series of operations performed by the user and stored in the memory in normal order if the forward direction is detected, and sequentially read the data items representing the series of operations performed by the user and stored in the memory in reverse order if the reverse direction is detected, and generate a display screen corresponding to each of the operations and display the display screen on the display module.

10. The electronic device according to claim 9, wherein the processor is further configured to:
sequentially and temporarily store, in the memory, the data items representing the operations performed by the user involved in the series of dictionary search processes; and
in response to detecting the reverse direction after receiving the input of the instruction by the user, sequentially read the temporarily stored data items representing the operations performed by the user in reverse order, from a data item representing a most recent operation to a data item representing a specific operation, and generate a display screen corresponding to each of the operations and display the display screen on the display module,
wherein the storing of the data items representing the series of operations includes storing data items which are included in the temporarily stored data items representing the operations performed by the user and which range from the data item representing the specific operation to the data item representing the most recent operation.

11. The electronic device according to claim 9, further comprising a touch position detection device,
wherein the processor detects the direction by detecting movement of a position touched by the user on the touch position detection device.

12. The electronic device according to claim 9, wherein the dictionary search processes include a jump search process, and the storing of the data items representing the series of operations includes storing a word specified by the jump search process.

* * * * *

UNITED STATES PATENT AND TRADEMARK OFFICE
CERTIFICATE OF CORRECTION

PATENT NO. : 9,135,246 B2  
APPLICATION NO. : 13/786409  
DATED : September 15, 2015  
INVENTOR(S) : Tomoya Kajikawa Page 1 of 1

It is certified that error appears in the above-identified patent and that said Letters Patent is hereby corrected as shown below:

IN THE CLAIMS

Column 10, claim 5, line 23 delete "exectuable" and insert --executable--.

Signed and Sealed this
Twelfth Day of April, 2016

Michelle K. Lee
*Director of the United States Patent and Trademark Office*